United States Patent
Beech (10) Patent No.: US 7,219,465 B2
(45) Date of Patent: May 22, 2007

(54) FLOATING BAIT CONTAINER

(75) Inventor: Joseph C. Beech, Tracy, MN (US)

(73) Assignee: Lindy-Little Joe, Inc., Brainerd, MN (US)

( * ) Notice: Subject to any disclaimer, the term of this patent is extended or adjusted under 35 U.S.C. 154(b) by 0 days.

(21) Appl. No.: 10/944,968

(22) Filed: Sep. 20, 2004

(65) Prior Publication Data

US 2005/0039378 A1    Feb. 24, 2005

Related U.S. Application Data

(63) Continuation-in-part of application No. 10/301,772, filed on Nov. 21, 2002, now Pat. No. 6,990,765.

(51) Int. Cl.
*A01K 97/04* (2006.01)
(52) U.S. Cl. .......................................................... 43/55
(58) Field of Classification Search .................... 43/55, 43/56
See application file for complete search history.

(56) References Cited

U.S. PATENT DOCUMENTS

| 292,123 | A |  | 1/1884 | Lindsay |  |
|---|---|---|---|---|---|
| 307,375 | A |  | 10/1884 | Busche |  |
| 1,841,956 | A |  | 1/1932 | Juergens |  |
| 2,040,559 | A |  | 5/1936 | Luttrell |  |
| 2,241,314 | A |  | 5/1941 | Mohler |  |
| 2,323,318 | A |  | 7/1943 | Farkas |  |
| 2,377,311 | A |  | 6/1945 | Campbell |  |
| 2,603,028 | A |  | 7/1952 | Roberts |  |
| 3,025,629 | A |  | 3/1962 | Sears |  |
| 3,478,463 | A |  | 11/1969 | Ruter |  |
| 3,919,803 | A |  | 11/1975 | Manguso |  |
| 4,079,698 | A | * | 3/1978 | Neff et al. | 119/223 |
| 4,251,943 | A |  | 2/1981 | Sawlsville |  |
| 4,498,190 | A | * | 2/1985 | Garlick, III | 383/28 |
| 4,570,374 | A |  | 2/1986 | Baxley |  |
| 4,642,934 | A |  | 2/1987 | Carlson et al. |  |
| 4,858,372 | A |  | 8/1989 | Ray |  |
| 4,864,769 | A |  | 9/1989 | Sandahl |  |
| 4,870,778 | A | * | 10/1989 | Sheppard | 43/55 |
| 4,890,413 | A | * | 1/1990 | Nelson et al. | 43/55 |
| 4,903,429 | A |  | 2/1990 | Tetenes |  |
| 4,905,404 | A |  | 3/1990 | Pasion et al. |  |
| 5,371,968 | A |  | 12/1994 | Casey |  |
| 5,722,197 | A |  | 3/1998 | Albritton |  |
| 6,065,239 | A | * | 5/2000 | Thomas et al. | 43/4.5 |
| 6,105,305 | A |  | 8/2000 | Edens |  |
| 6,662,488 | B1 |  | 12/2003 | Heimbrock et al. |  |
| 2002/0162272 | A1 |  | 11/2002 | Pripusich |  |

OTHER PUBLICATIONS

New Product Announcement, North American Fisherman (Oct./Nov. 2002), p. 55.
Leech Tamer advertisement, JNB Originals, http://www.driftbag.com.
Bait Tamer Live Storage advertisement, JNB Originals, http://www.driftbag.com.

* cited by examiner

*Primary Examiner*—Kurt Rowan
(74) *Attorney, Agent, or Firm*—Kinney & Lange, P.A.

(57) ABSTRACT

A live bait container includes a flexible, cylindrically shaped fabric mesh body having a side wall, a top wall, a bottom wall, and an interior storage space. A bottom hoop is positioned near the bottom wall. A first access port in one of the walls communicates with the interior storage space. The container also includes a fabric mesh pouch positioned on an outer surface of the side wall.

15 Claims, 13 Drawing Sheets

FLOATING BAIT CONTAINER

CROSS-REFERENCE TO RELATED APPLICATION(S)

This application is a continuation-in-part (CIP) of U.S. patent application Ser. No. 10/301,772, entitled "Floating Bait Container", filed Nov. 21, 2002 now U.S. Pat. No. 6,990,765 by Joseph Beech.

BACKGROUND OF THE INVENTION

The present invention relates to live bait containers and, in particular, to a container having a fabric mesh sewn to rigid stays to define displaced walls and an enclosed storage cavity including a resealing access port and a pocket having an access port sewn to the mesh wall.

A longstanding problem of live bait fishermen, who use minnows and other bait that must remain submerged in water, is providing a means for storing the bait while fishing. Varieties of rigid walled bait containers and traps with hinged doors and perforated walls exist. These containers are typically constructed from metallic mesh screen or perforated metal or plastic. These containers can be dragged from a boat or can be mounted inside a solid walled outer container that supports a quantity of water.

Rigid walled, built-in bait wells and/or live wells are also provided on many fishing boats. In lieu of towing the foregoing bait containers and depending upon the size of the live well, many of the foregoing bait containers can be inserted into a live well. The bait is thereby segregated from any fish that are caught and kept. Damage can occur, however, to the bait, captured fish, bait container and/or live well with normal jostling of the bait container during boat operation.

Mesh fabric outfitted with buoyant floats has also been used to store live bait such as leeches and as a holding pen for live wells. The walls of such assemblies, however, can collapse against the contained bait and/or fish and obstruct normal gill movement and breathing, thereby severely effecting bait mortality and storage time.

The present invention was developed to provide an economical mesh fabric, live bait container with resealing access port that can support bait, such as minnows and other aquatic bait or insects (e.g. grasshoppers and crickets). The container and bait can be stored in a live well. The walls are displaced with resilient, flexible stays to define a bait storage space. One or more compartments can be provided to segregate multiple types or different species of bait. One or more buoyant floats can be included to support the container. The stays can flex during the boat movement allowing the walls to collapse and expand. Damage is thereby minimized to the stored bait, fish, bait container and/or live well. The bait container can also be collapsed for storage.

BRIEF SUMMARY OF THE INVENTION

The present invention relates to a live bait container. The live bait container includes a flexible cylindrical shaped fabric mesh body having a side wall, a top wall, a bottom wall, and an interior storage space. A bottom hoop is positioned near the bottom wall of the body. A first access port in one of the walls communicates with the interior storage space. In addition, the container includes a fabric mesh pouch positioned on an outer surface of the side wall.

DETAILED DESCRIPTION

Referring to FIGS. 1 through 5, views are shown to a mesh fabric, live bait container 2. The sidewalls 4 of the container 2 are supported in a generally cylindrical shape via a pair of flexibly resilient stays or hoops 6. One of the stays 6 is shown in cutaway and is formed from a flat band of a water impermeable material (e.g. plastic or a coated material) that is rolled and sewn into a hem 7 at the end of the container 2. Each stay 6 generally defines an endless hoop, although several linear sections might be secured to the walls 4 to prevent the walls from collapsing against each other. The material used in the stays 6 is selected to be resistant to UV light and other environmental forces and to provide a sufficient resilience to return to shape, if distorted.

Figure 1:
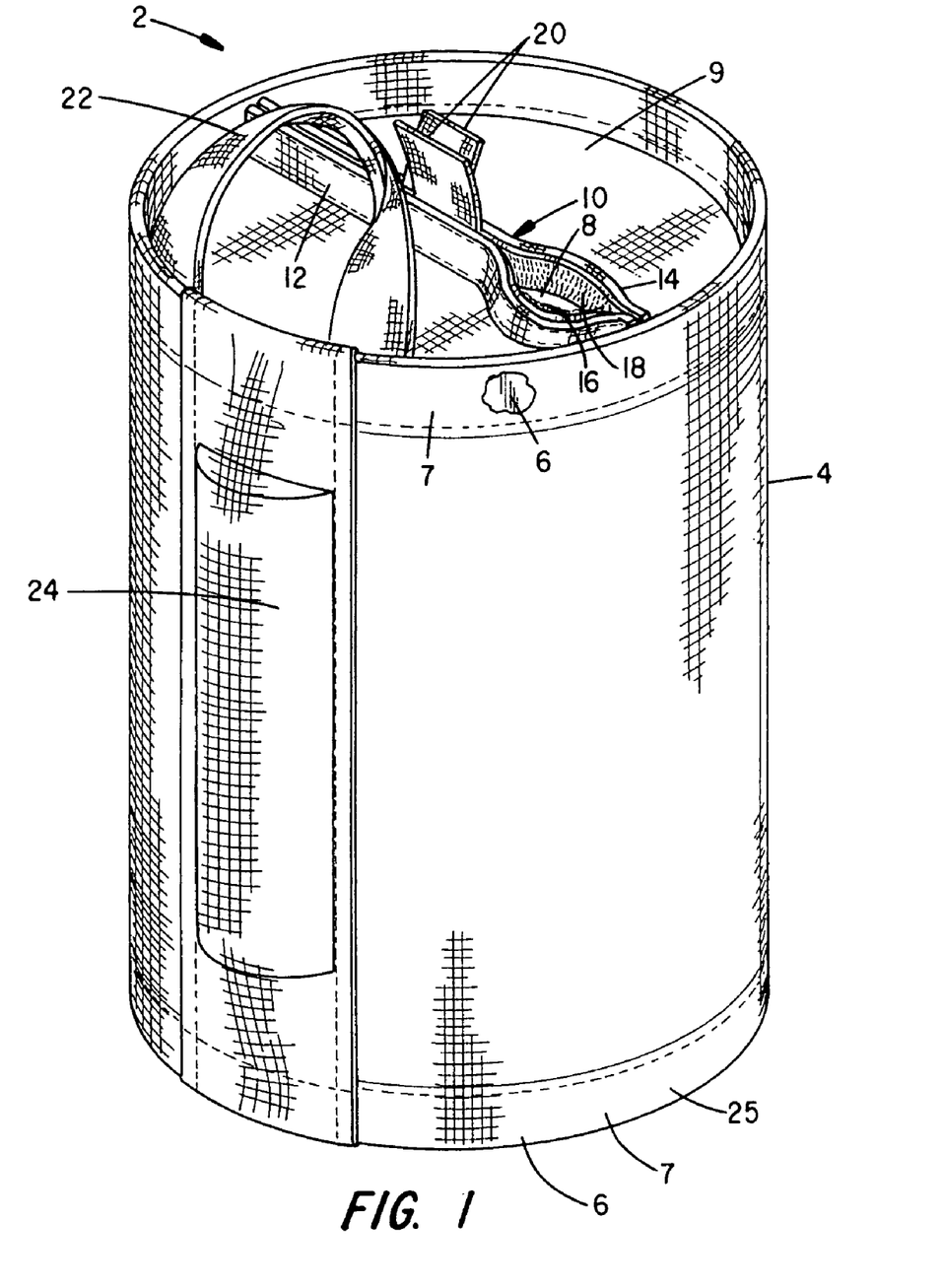
FIG. 1 is a perspective view a cylindrical mesh fabric container having a buoyant flotation member and an end access port defined with hook and loop fastener material.
Figure 2:
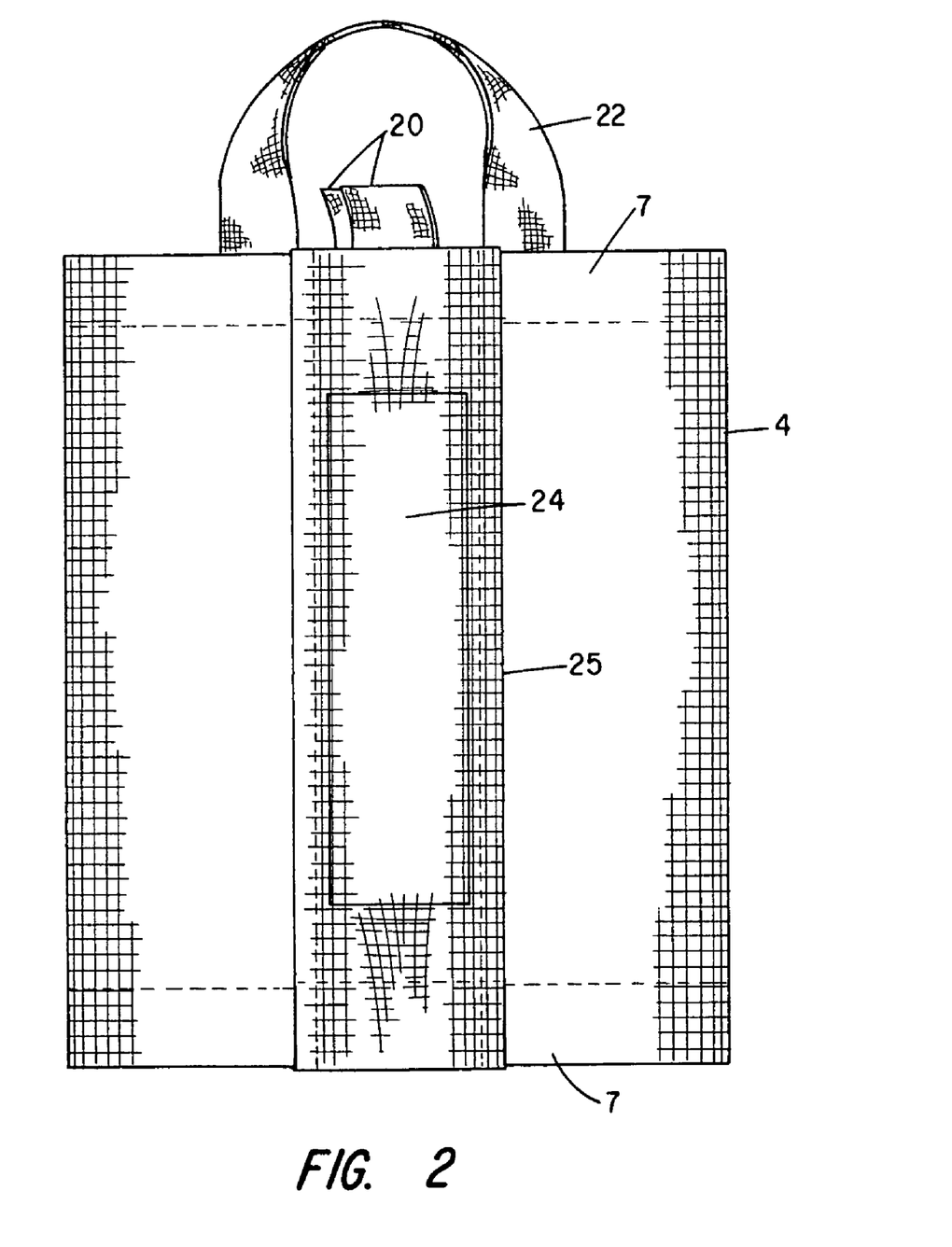
FIG. 2 is a front view thereof.
Figure 3:
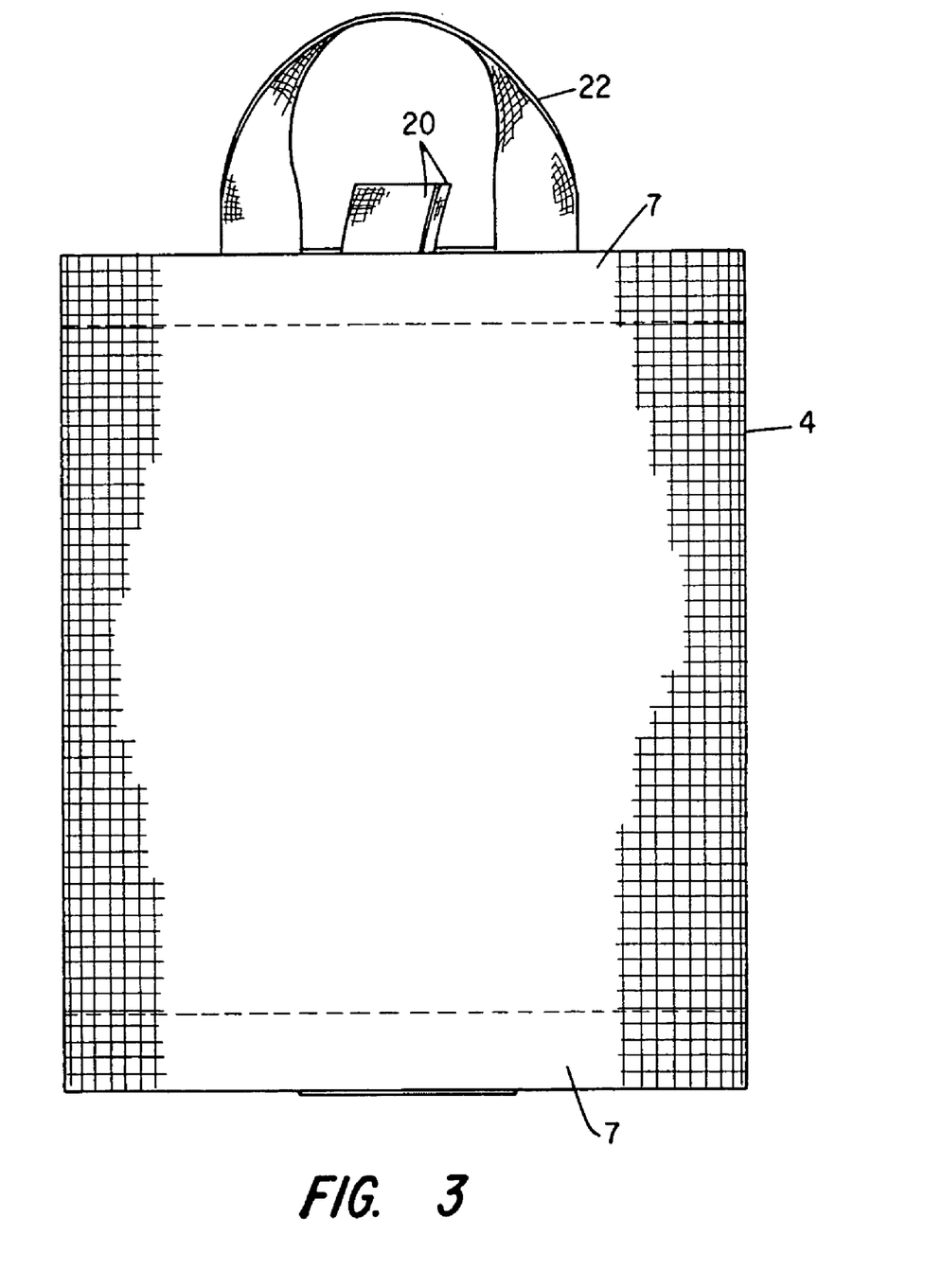
FIG. 3 is a rear view thereof.
Figure 4:
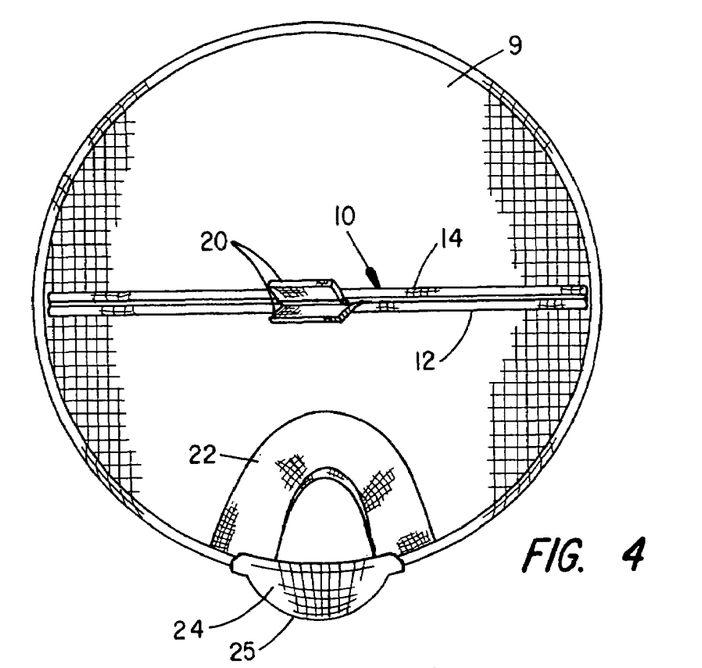
FIG. 4 is a view of the top or resealing end thereof.
Figure 5:
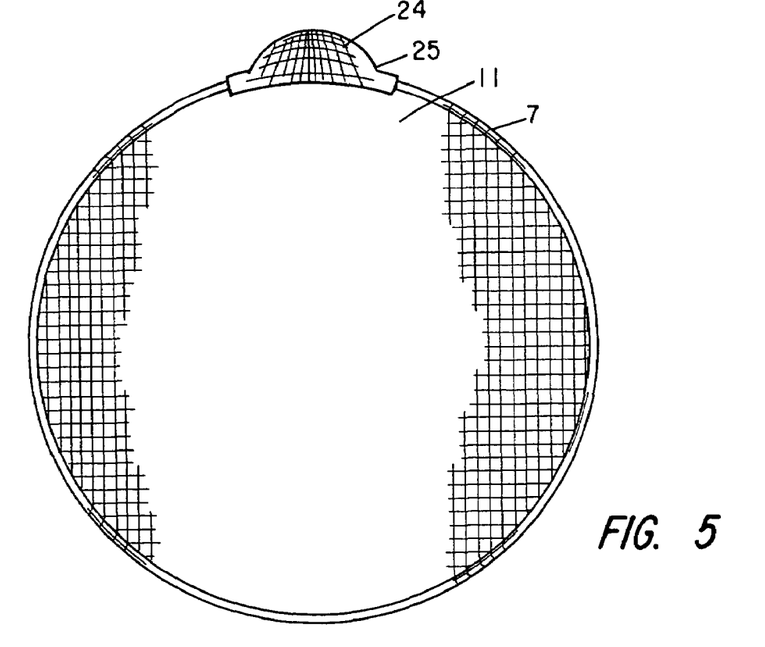
FIG. 5 is a bottom view thereof.

The shape, number and positioning of the stays 6 can be varied depending upon the geometry of a desired container. A cylindrical container shape is presently preferred to facilitate transport of the container 2 to and from a bait shop in typically available buckets. The container 2 can be constructed with any combination of flat and/or arcuate walls.

Access to an interior storage space 8 is obtained through a resealing access port 10 at an end wall 9. The space 9 can be segregated into several compartments with suitable walls, reference FIG. 6, that can be permanently sewn into the container 2 or attached with strips of hook and loop material or other fasteners to the sidewall 4. The access port 10 can be formed into either of the end walls 9 or 11 or the sidewall 4. Any divider walls are typically positioned transverse to the access port 10 to facilitate access to each compartment.

The access port 10 is constructed of overlapping flaps 12 and 14 that are covered with hook and loop fastener material 16 and 18. Pull-tabs 20 are secured along the flaps 12 and 14 to facilitate opening or re-sealing the port 10. A looped, carry strap or handle 22 is also sewn to the hem 7 at end wall 9, although can be mounted anywhere on the container 2.

The container walls 4, 9 and 11 can be colored as desired; however, it has been found that minnows tend to collect and hover near dark colors. The end walls 9 and 11 are therefore typically colored black and the sidewall 4 is colored a contrasting color, such as fluorescent yellow or other lighter color, and against which the minnows are readily visible. The clustering of the bait at the ends 9 and 11 reduces bait movement and conserves energy, which provides for livelier bait action when the bait is presented later to a prey species.

Secured along a longitudinal side of the container 2 is a buoyant float 24. The float 24 is secured in a hemmed pocket 25. The float 24 is positioned to assure ready access to contained bait and is sized to support a specified amount of bait. The shape, number and positioning of any floats 24 can be selected as desired. Presently, the float 24 exhibits a half-moon profile.

The float 24 orients the container 2 to minimize forces that might act to open access port 10 during normal container movements in a live well. The float 24 also acts as a bumper to prevent injuring stored bait or permanently damaging the container 2. The flexible stays 6 and walls 4, however, are able to distort and collapse as the container 2 is jostled. Multiple floats 24 and/or weights (not shown) can be positioned around the walls of the container 2 to properly balance the container 2 and preferably maintain the access port 10 at the surface to avoid spillage of bait in the event the port 10 opens during jostling or is inadvertently not closed.

The container 2 might also be tethered to an anchor and suspended in a body of water at a suitable depth and/or thermocline to facilitate bait storage between fishing excursions. If submerged, a tether line and marker buoy (not shown) that floats at the surface can also be secured to the container 2 to facilitate retrieval.

The size of the storage space 8 can be varied to accommodate different volumes of bait. Once filled, the container 2 is normally supported in a bucket for transport to a holding area, for example, a live well or lake. Containers 2 of the present type have found particular application for segregating bait from captured fish in boat live wells. Commercial bait dealers also use several containers for segregating distinct sizes and species of bait in aerated storage tanks during transport.

Figure 6:
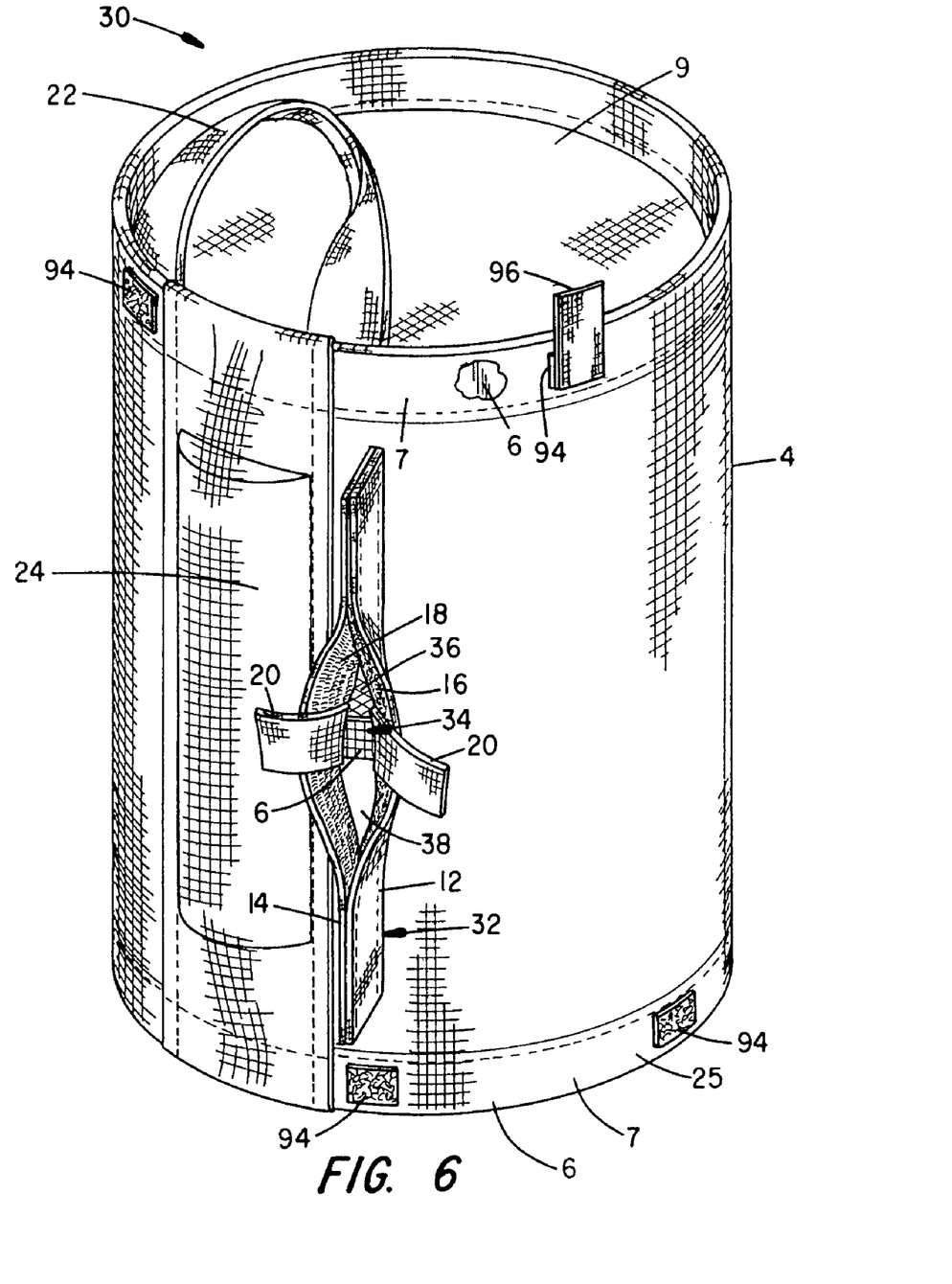
FIG. 6 is a front view of a container having a longitudinal hook and loop access port.

FIG. 6 depicts an alternative container 30 that is substantially identical to the container 2, except that an access port 32 extends longitudinally along the sidewall 4. The port 32 is sealed with strips 16 and 18 of hook and loop fastener material. The container 30 is also shown with a mesh divider wall 34 that can be secured to the walls 4 to define separate storage compartments 36 and 38. Multiple species (e.g. leeches and minnows) or different types of species might be stored in the different compartments 36 and 38. A stay 6 can be provided at the periphery of the divider 34 and the divider 34 can be secured permanently or with strips of hook and loop fastener material to the walls 4.

Figure 7:
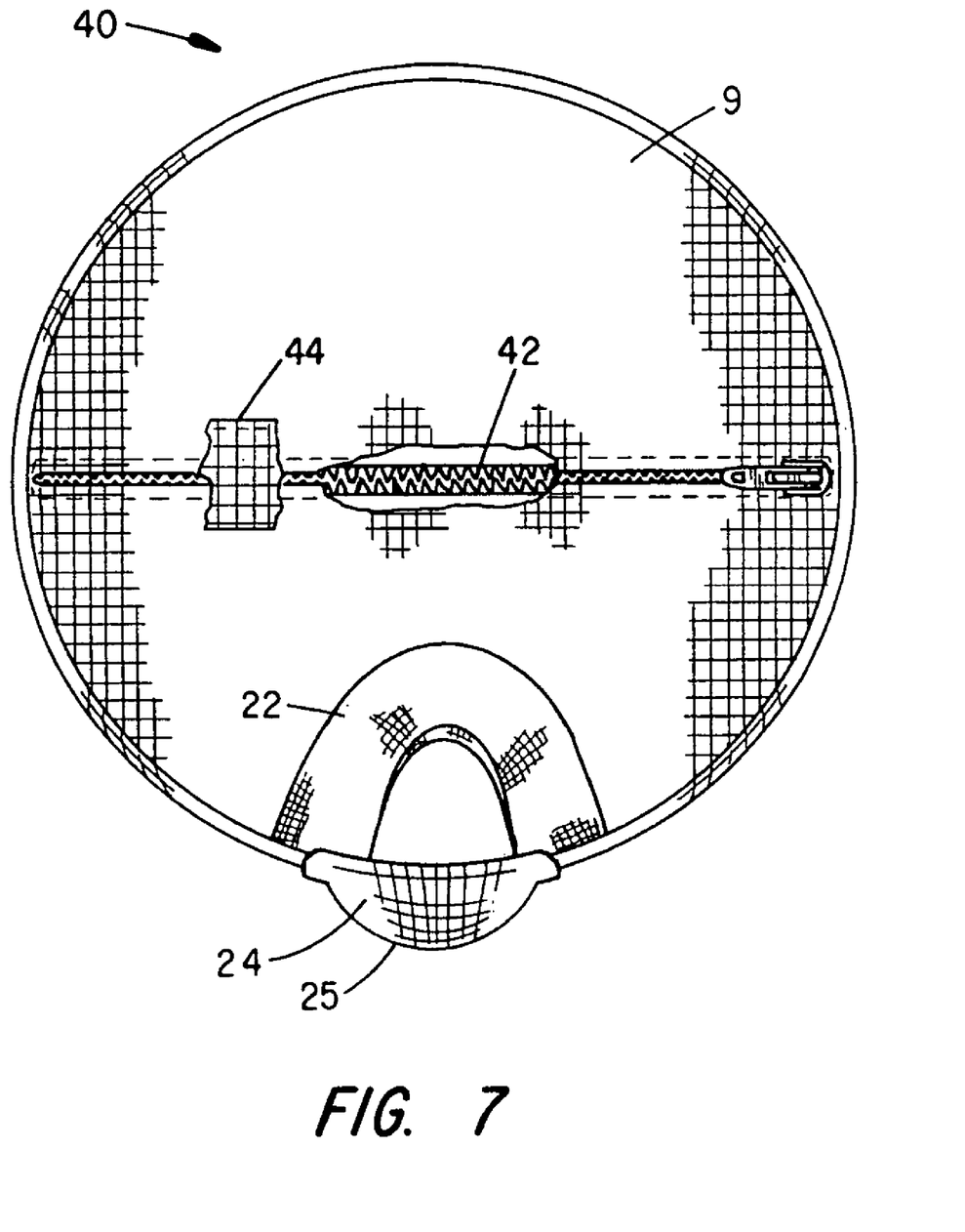
FIG. 7 is an end view of a container having an end zipper access port.
Figure 8:
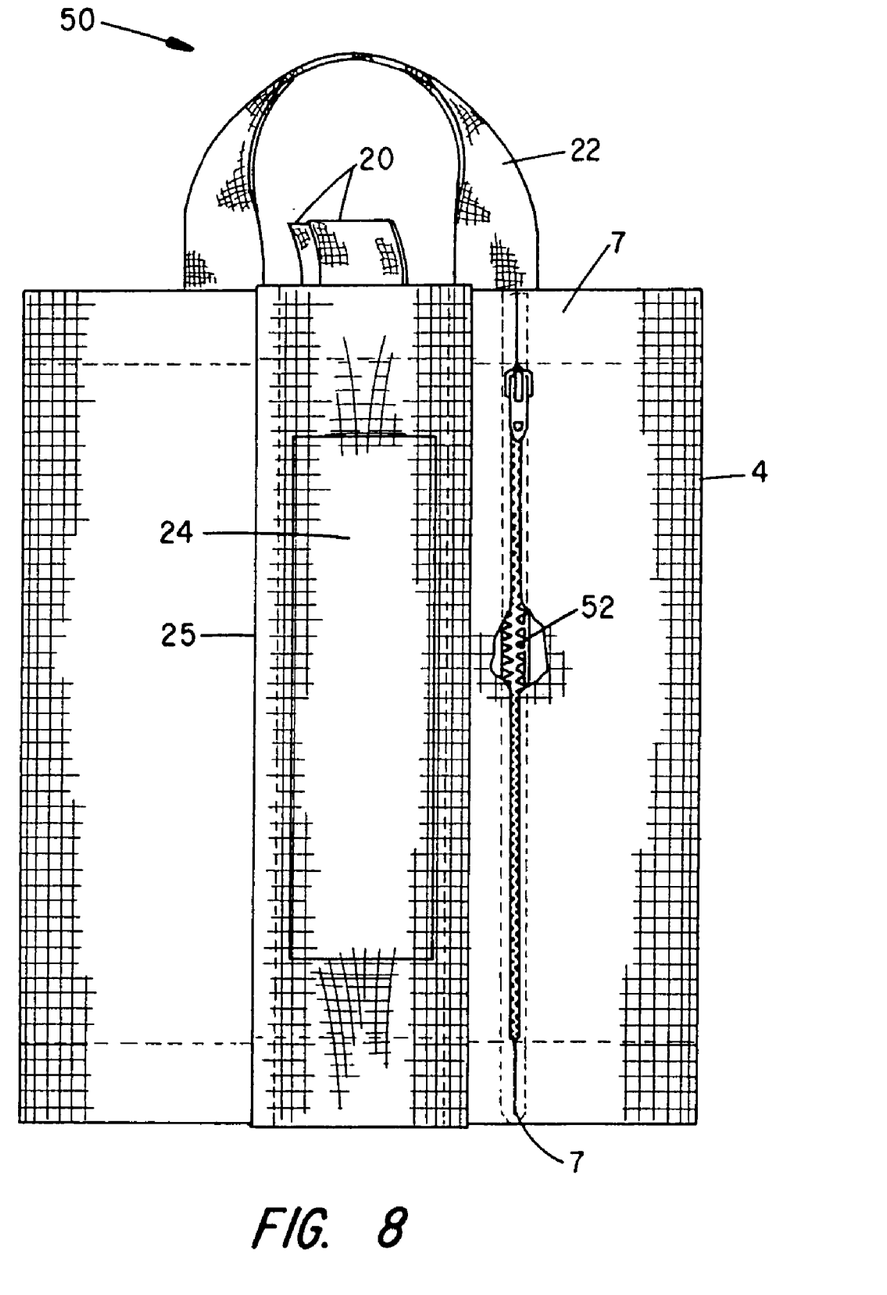
FIG. 8 is a front view of a container having a longitudinal zipper access port.

FIGS. 7 and 8 depict alternative containers 40 and 50, which provide end and longitudinal zippers 42 and 52 and portions of which are shown in enlarged scale. The zippers 42 and 52 are secured such that the fabric mesh is closely fit to the zippers 42 and 52. A cover flap 44 (shown in partial cutaway) might also be sewn to the walls 4, 9 and 11 to cover the zippers 42 and 52 and reduce possible escape of bait, if the containers 40 and 50 are accessed while floating.

Figure 9:
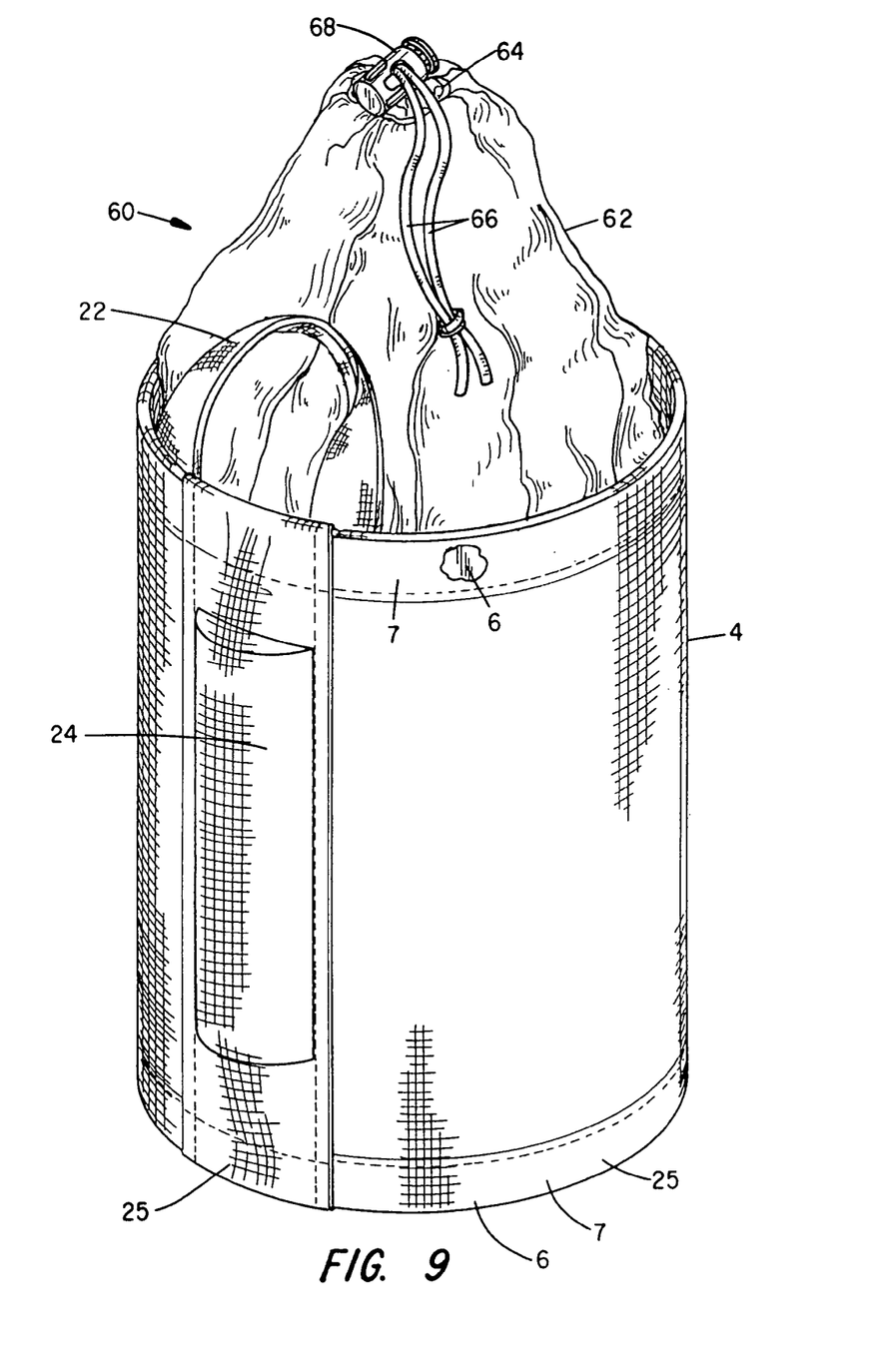
FIG. 9 is a perspective view of a container having a domed end with a drawstring closure.

FIG. 9 discloses a container 60 having a porous fabric sleeve or end cowling piece 62. The sleeve 62 is sewn to the hem 7 and provides an opening 64 that is bounded by drawstrings 66 and a sliding pinch fastener 68. The opening 64 can be adjusted to fit closely about the arm to minimize bait escaping during removal.

Figure 10:
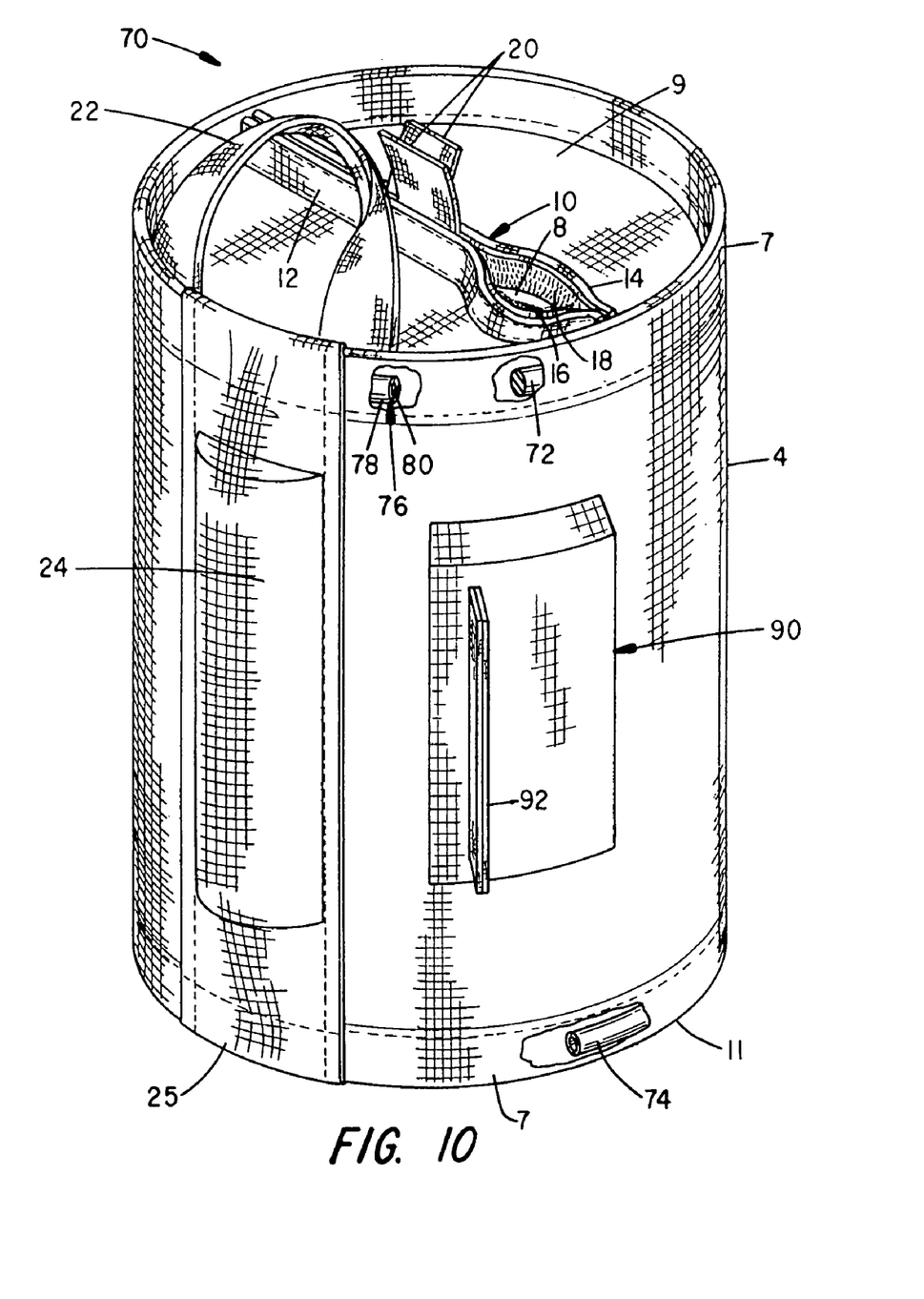
FIG. 10 is a perspective view of a container having alternative types of stays constructed of foam cord, nylon cord/rod stock and a foam covered core piece and a secondary storage compartment.

FIG. 10, lastly depicts a container 70 substantially identical to the container 2 but outfitted with a number of alternative types of stays 72, 74 and 76. The stay 72 is constructed of an open or closed cell foam cord (e.g. ⅜ to 1-inch diameter) that can be secured within the hems 7 at each end 9 and 11, although is only shown at one of the hems 7. A buoyant stay 72 might be used in lieu of the float 24 and/or might be combined with the non-buoyant stays 6.

The stay 74 comprises a solid nylon cord piece that can be secured to the hems 7 in lieu of a flat band 6. The stay 74 can exhibit any desired hollow or solid cross-sectional shape and can be constructed from a polymer, nylon plastic, polypropylene or other suitably resilient synthetic material that flexes, yet springs back to shape.

The stay 76 comprises a foam outer sheath 78 that is fitted over a solid nylon core 80. The combination stay 76 can be sized to any suitable diameter and resilience required for the size container and can be used in combination with or in lieu of the float 24. The core 80 enhances the rigidity and resilience of the stay 76 and the sheath 78 provides buoyancy and acts as a bumper. Although the stays 6, 72, 74 and 76 are shown as being mounted in the hems 7, they might also be retained with loops or sleeve sections that are permanently or detachably mounted to the wall 4, 9 and 11.

Attached to the wall 4 is a separate pocket or bait compartment 90 that can either be sewn or secured with strips of hook and loop fastener material 94. The access port 92 is sealed with mating strips of hook and loop fastener material that are sewn to the facing flaps. Other strips 94 of hook and loop fastener material 94 might also be provided at the ends of the container 30 to facilitate attachment to adjoining container(s) 30 that are secured with overlapping hinge straps 96.

Figure 11:
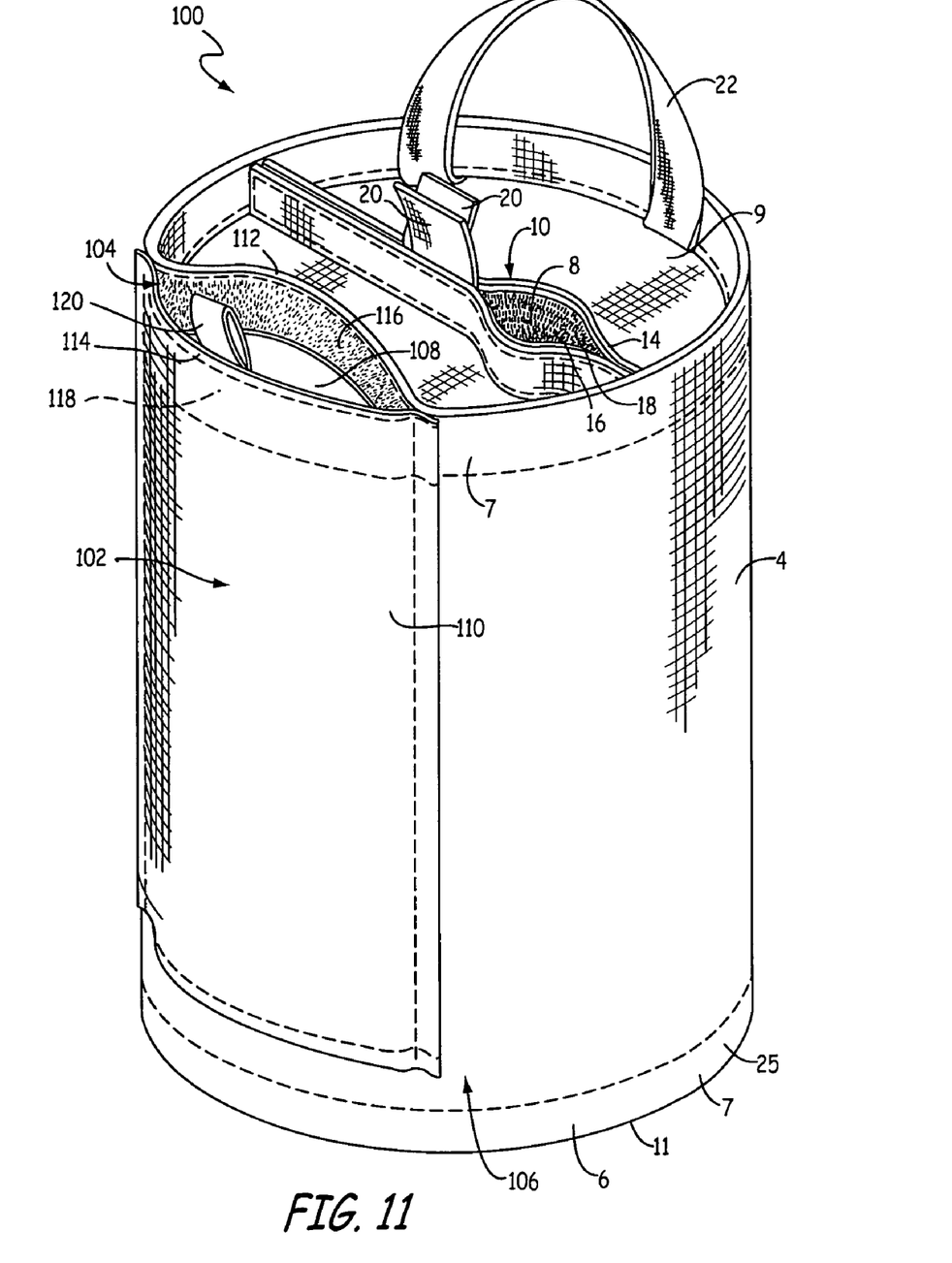
FIG. 11 is a perspective view of a further embodiment of a cylindrical mesh fabric container having an end access port and a pocket having an access port attached to the exterior wall of the container.
Figure 12:
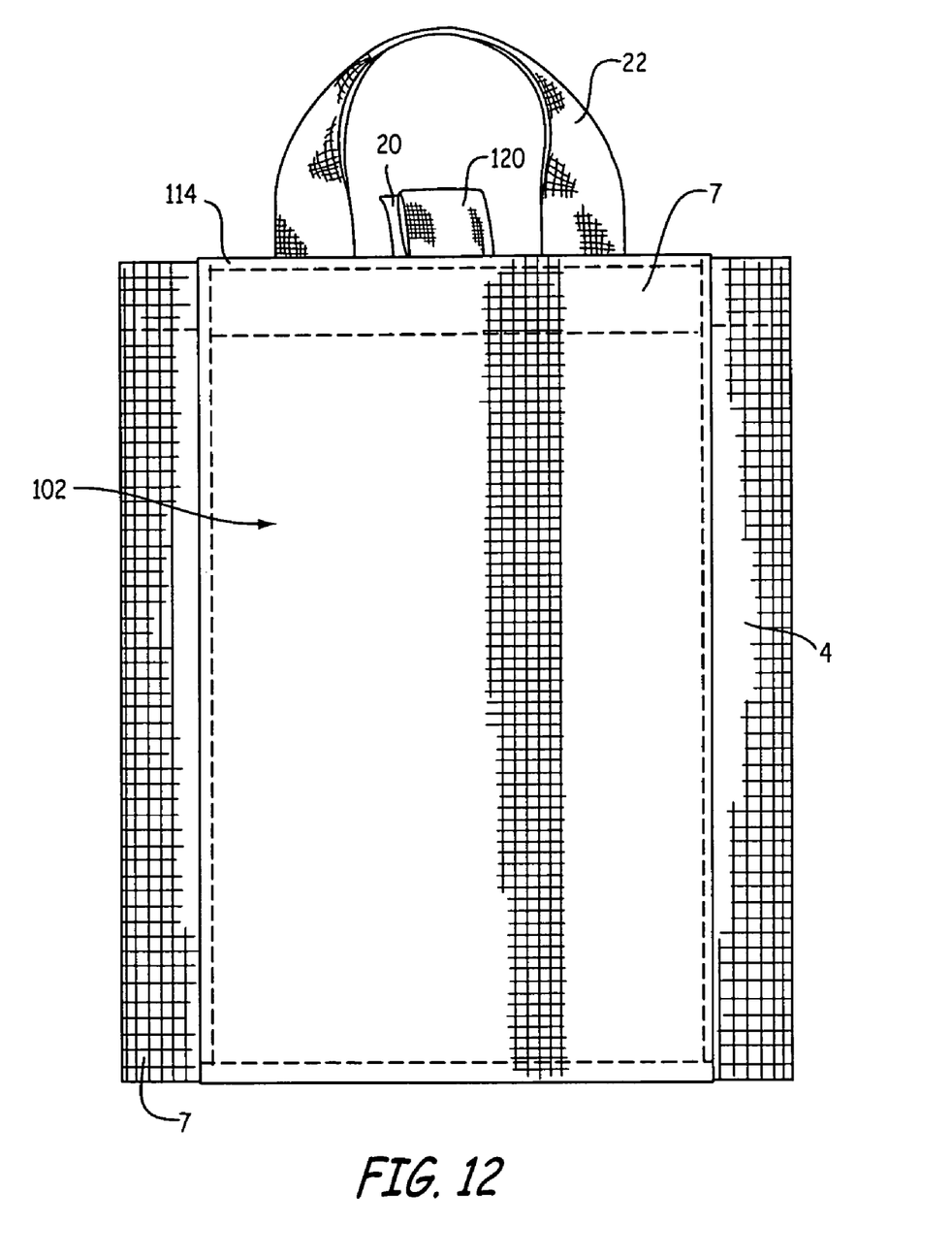
FIG. 12 is a rear view thereof.
Figure 13:
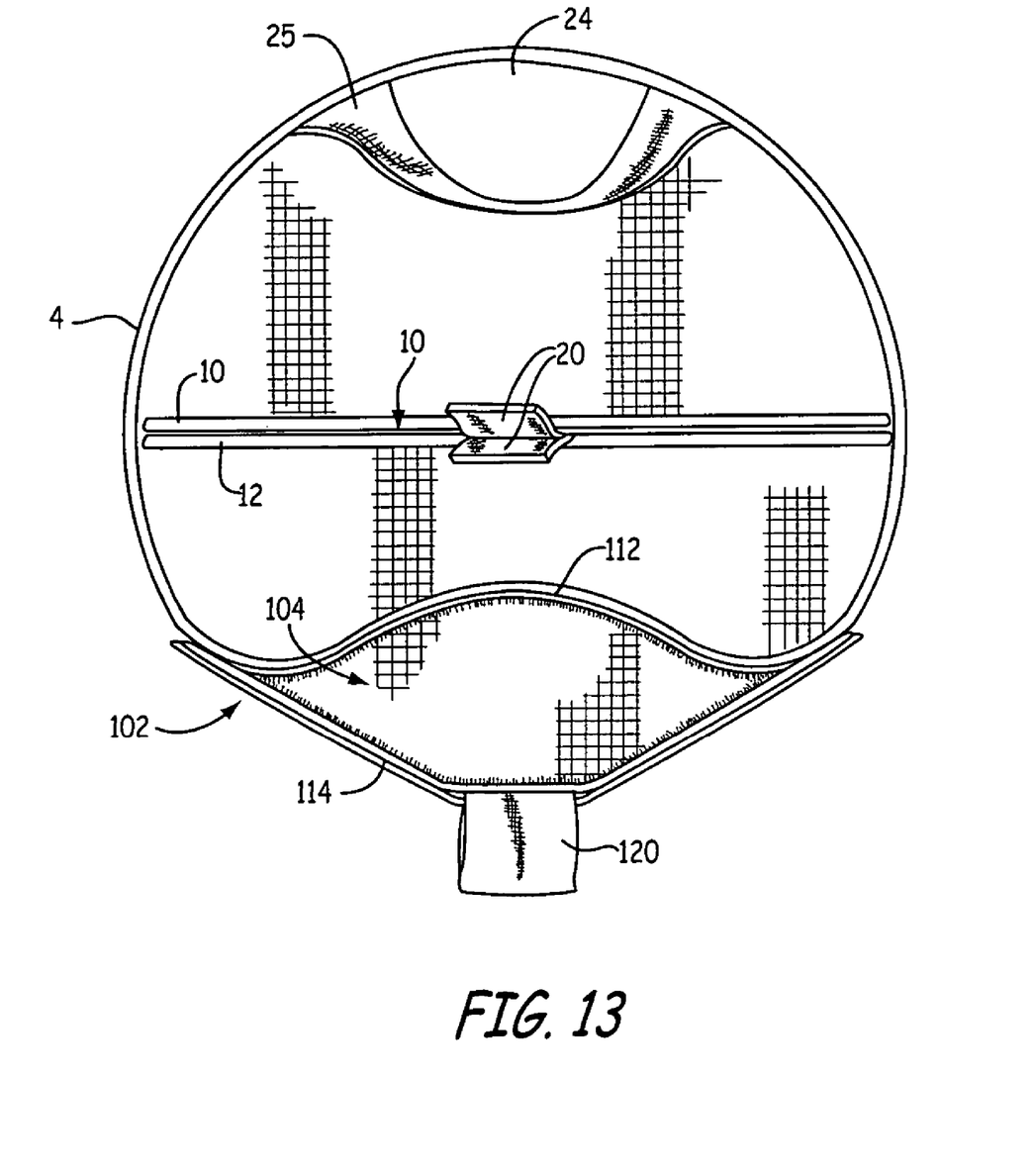
FIG. 13 is a top view of the resealing end thereof.

FIG. 11 is a perspective view of a further embodiment of a cylindrical mesh fabric container 100 having an end, resealing access port 10 and a fabric mesh pouch 102 having an access port 104 attached to exterior wall 4 of container 100. FIG. 12 is a rear view thereof and FIG. 13 is a top view of the resealing end of the container thereof. Container 100 shown in FIGS. 11 and 12 is similar to that shown in FIGS. 1–5, however, container 100 of FIGS. 11 and 12 includes the pouch 102 positioned on an outer surface 106 of the container side wall 4 Although a pouch is shown in FIGS. 11–13, other types of secondary storage compartments may be attached and utilized with the live bait container.

The live bait container 100 includes a cylindrical shaped side wall 4, a top wall 9, and a bottom wall 11. Container 100 defines interior storage space 8 which is accessed through the resealing first access port 10 in wall 9. Pouch 102 is attached to outer surface 106 of side wall 4 of the container. However, in further embodiments, pouch 102 may be attached to an interior wall or other walls of container 100.

In the embodiment shown in FIGS. 11–13, pouch 102 includes a first wall 108 defined by outer surface 106 of side wall 4 and a second wall 110 attached to first wall 108. In further embodiments of the mesh pouch, first wall 108 may be formed of a piece of material separate from the side wall.

Pouch 102 includes the resealing, second access port 104 for obtaining access to pouch 102. Second access port 104 includes a first upstanding flap 112 extending from an edge of first wall 108 and a second upstanding flap 114 extending from an edge of second wall 110. Fastener material 116 and 118 is attached to opposing surfaces 112, 114 of first and second walls 108, 110 to provide a resealable opening. In particular, fastener materials 116, 118 attach at the adjacent edges of first and second walls 108, 110. In addition, pull tab 120 is attached to an edge of second wall 110 to facilitate opening and closing of access port 104.

Figure 14:
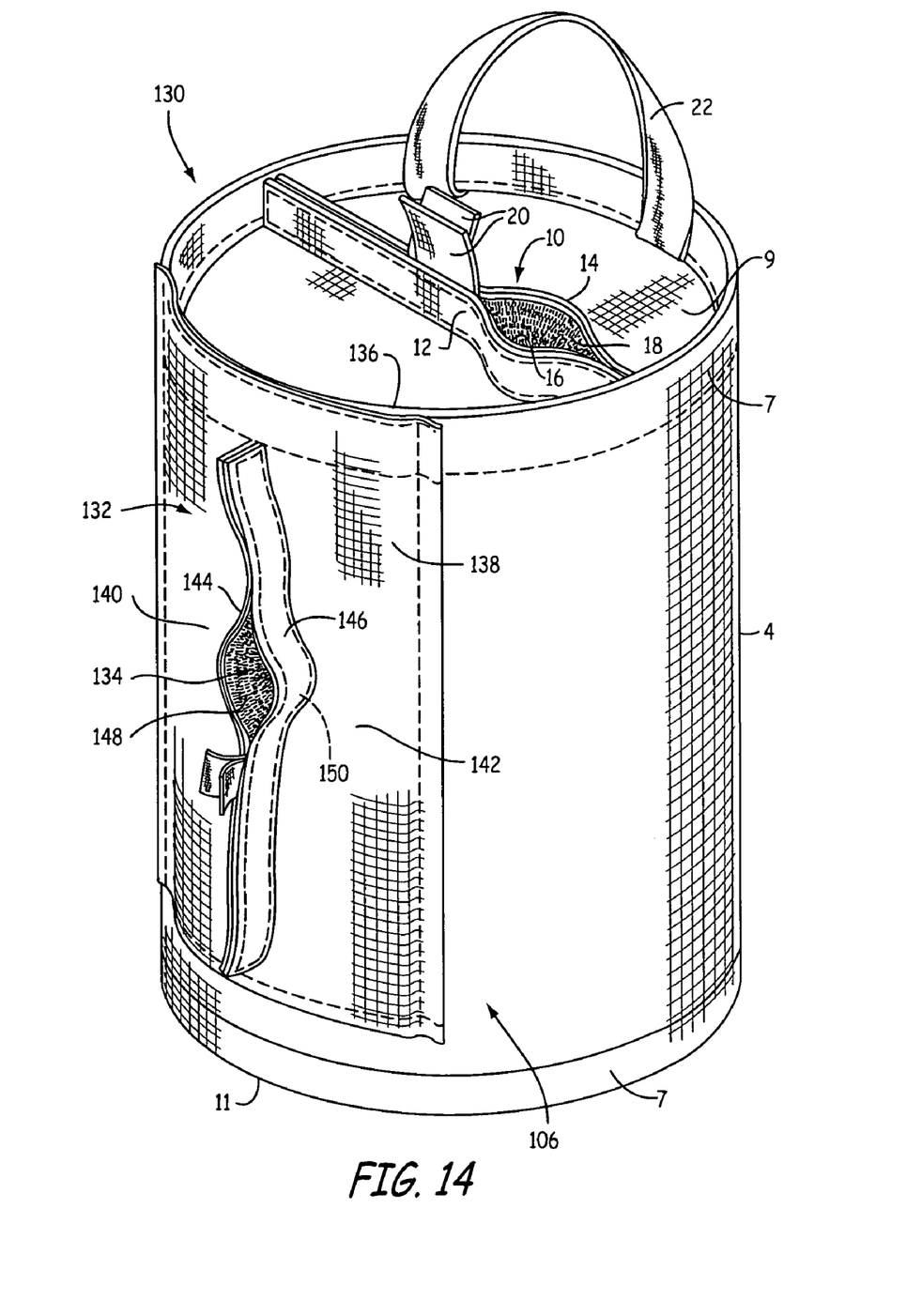
FIG. 14 is a perspective view of a further embodiment of a cylindrical mesh fabric container including a pocket with a side access port.

FIG. 14 is a perspective view of a further embodiment of a live bait container 130 including a flexible mesh pouch 132 with a side access port 134. Pouch 132 includes a first wall 136 defined by outer surface 106 of side wall 4 and a second wall 138 attached to first wall 136 of pouch 132. Second wall 138 includes first and second fabric mesh sections 140 and 142. Access port 134 of pouch 132 includes first and second upstanding flaps 144 and 146 extending from first and second sections 140, 142 of second wall 138. Fastener material 148 and 150 attach to opposing surfaces of first and second sections 140, 142 of second wall 138 to provide a resealable opening. First and second pull tabs 152, 154 are attached to adjacent edges of sections 140, 142 of second wall 138 to facilitate opening and closing of access port 134.

Although the present invention has been described with reference to preferred embodiments, workers skilled in the art will recognize that changes may be made in form and detail without departing from the spirit and scope of the invention. For example, the foregoing stays, floats, and/or enclosure assemblies, among other features, can be used singularly with a live bait container or can be arranged in different combinations to provide a variety of improved bait containers.

The invention claimed is:

1. A live bait container comprising:
a flexible, cylindrically shaped fabric mesh body having a side wall, a top wall, a bottom wall and an interior storage space;
a bottom hoop positioned near the bottom wall;
a first access port in one of the walls communicating with the interior storage space; and
a fabric mesh pouch positioned on an outer surface of the side wall, the fabric mesh pouch comprising:
a first wall defined by the outer surface of the side wall;
a second wall attached to the first wall; and
a resealable second access port comprising first and second opposing upstanding flaps joinable by a fastening system, wherein the first and second upstanding flaps extend from adjacent top edges of the first and second walls, and the fastening system comprises first and second hook and loop fastener material attached to opposing surfaces of the first and second flaps to provide a resealable opening.

2. The live bait container of claim 1 and further comprising a pull tab attached to an edge of the second wall to facilitate opening and closing of the resealable opening.

3. The live bait container of claim 1, wherein the second wall comprises first and second sections and the first and second upstanding flaps extend from the first and second sections and the fastening system comprises first and second strips of fastener material attached to opposing surfaces of the first and second flaps to provide a resealable opening.

4. The live bait container of claim 3 and further comprising first and second pull tabs attached to adjacent edges of the first and second sections to facilitate opening and closing of the resealable opening.

5. A live bait container comprising:
a fabric mesh formed to define a flexible, cylindrically shaped body having a side wall, a top wall, a bottom wall and an interior storage space;
a flexibly resilient stay positioned near the bottom wall;
a first access port communicating with the interior storage space; and
a secondary storage compartment connected to the side wall, the secondary storage compartment comprising:
a first wall defined by the side wall of the body; and
a second wall attached to an outer surface of the first wall; and
a resealable second access port comprising:
a first upstanding flap extending from a top edge of the first wall;
a second upstanding flap extending from a top edge of the second wall;
hook and loop fastener strips on opposing surfaces of the flaps to provide a resealable opening;
at least one pull tab attached to the second access port to facilitate opening and closing of the resealable opening.

6. A live bait container comprising:
a cylindrical flexible housing made of fabric mesh having a side wall, a top wall and a bottom wall;
an interior storage compartment defined by the housing;
a first access port through one of the walls of the housing communicating with the interior storage space;
a pouch on an outer surface of the side wall, the pouch including:
a first wall defined by the outer surface of the side wall; and
a second wall attached to the first wall; and
a resealable second access port for the pouch, the resealable second access port comprising first and second opposing upstanding flaps joinable by fastener material and wherein the first and second upstanding flaps extend from adjacent edges of the first and second walls, and the fastener material comprises first and second strips of fastener material attached to opposing surfaces of the first and second flaps to provide a resealable opening.

7. The live bait container of claim 6 wherein the second wall comprises first and second sections.

8. The live bait container of claim 6 and further comprising a pull tab attached to an edge of the second wall to facilitate opening and closing of the resealable opening.

9. The live bait container of claim 6, wherein the first and second upstanding flaps extend from the first and second sections and the fastener material comprises first and second strips of fastener material attached to opposing surfaces of the first and second flaps to provide a resealable opening.

10. The live bait container of claim 9 and further comprising first and second pull tabs attached to adjacent edges of the first and second sections to facilitate opening and closing of the resealable opening.

11. The live bait container of claim 6 wherein the first and second upstanding flaps extend from adjacent top edges of the first and second walls such that the resealable second access port is positioned at a top outer edge of the bait container, and wherein the fastener material comprises hook and loop fastener material.

12. A live bait container comprising:
a fabric mesh formed to define an enclosure having a plurality of walls and surrounding an open interior storage space, wherein the enclosure includes:
a cylindrically shaped fabric mesh side wall having a top edge and a bottom edge;
a fabric mesh bottom panel secured to the bottom edge;
a top panel formed by first and second panel sections, each panel section being made of fabric mesh;
a first access port to the interior storage space formed by first and second upstanding flaps extending upward from the first and second panel sections, respectively, and first and second strips of fastener material on opposing surfaces of the first and second flaps, respectively, to provide a resealable opening;

a fabric mesh pouch on the side wall wherein the pouch is comprised of a first wall and a second wall attached together; and a resealable second access port to the pouch comprising first and second opposing upstanding flaps extending from adjacent edaes of the first and second walls and are joinable by third and fourth strips of fastener material.

13. The live bait container of claim 12 wherein the first wall of the pouch is defined by a surface of the side wall.

14. The live bait container of claim 12 and further comprising a pull tab attached to an edge of the second wall to facilitate opening and closing of the resealable opening.

15. The live bait container of claim 12 wherein the first and second opposing upstanding flaps of the resealable second access port extend from adjacent top edges of the first and second walls such that the resealable second access port is positioned at a top outer edge of the bait container, and wherein the second and third strips of fastener material comprise hook and loop fastener material.

* * * * *

UNITED STATES PATENT AND TRADEMARK OFFICE
CERTIFICATE OF CORRECTION

| | | |
|---|---|---|
| PATENT NO. | : 7,219,465 B2 | Page 1 of 1 |
| APPLICATION NO. | : 10/944968 | |
| DATED | : May 22, 2007 | |
| INVENTOR(S) | : Joseph C. Beech | |

It is certified that error appears in the above-identified patent and that said Letters Patent is hereby corrected as shown below:

On The Title Page, Item (56) OTHER PUBLICATIONS,
delete "Bait Tamer Live Storage" insert --Bait Tamer Live Bait Storage--

Column 7, Line 9, delete "edaes", insert --edges--

Signed and Sealed this

Twenty-first Day of August, 2007

JON W. DUDAS
*Director of the United States Patent and Trademark Office*